(12) United States Patent
Moon et al.

(10) Patent No.: US 11,491,909 B2
(45) Date of Patent: Nov. 8, 2022

(54) EXTERNAL FACING COMMUNICATIONS FOR AUTONOMOUS VEHICLES

(71) Applicant: Waymo LLC, Mountain View, CA (US)

(72) Inventors: Maria Moon, Mountain View, CA (US); Philip Nemec, San Jose, CA (US); Ryan Powell, San Francisco, CA (US); Bruce Mai, Sacramento, CA (US)

(73) Assignee: Waymo LLC, Mountain View (CA)

( * ) Notice: Subject to any disclaimer, the term of this patent is extended or adjusted under 35 U.S.C. 154(b) by 29 days.

(21) Appl. No.: 17/022,998

(22) Filed: Sep. 16, 2020

(65) Prior Publication Data

US 2022/0080879 A1 Mar. 17, 2022

(51) Int. Cl.
*B60Q 1/26* (2006.01)
*F21S 10/06* (2006.01)
*F21S 10/02* (2006.01)
*B60Q 1/54* (2006.01)

(52) U.S. Cl.
CPC .............. *B60Q 1/2603* (2013.01); *B60Q 1/54* (2013.01); *F21S 10/02* (2013.01); *F21S 10/06* (2013.01)

(58) Field of Classification Search
CPC ......... B60Q 1/2603; B60Q 1/54; F21S 10/02; F21S 10/06
See application file for complete search history.

(56) References Cited

U.S. PATENT DOCUMENTS

| 10,391,931 | B2 | 8/2019 | Shmueli Friedland et al. |
| 10,490,163 | B1* | 11/2019 | Wisniewski ............ G01S 19/51 |
| 10,696,222 | B1 | 6/2020 | Pandit et al. |
| 2015/0057896 | A1* | 2/2015 | Yamane ................... B60J 5/047 701/49 |
| 2015/0135108 | A1* | 5/2015 | Pope ...................... G06F 3/0484 715/767 |
| 2016/0349066 | A1* | 12/2016 | Chung ............... G01C 21/3658 |
| 2017/0072844 | A1 | 3/2017 | Kalanick et al. |
| 2017/0178269 | A1 | 6/2017 | Mckinnon et al. |
| 2019/0232860 | A1* | 8/2019 | Ferrone ................ B60Q 1/2615 |
| 2019/0266859 | A1* | 8/2019 | Song .................... G05D 1/0248 |
| 2020/0062172 | A1* | 2/2020 | Lujan ....................... B60Q 1/50 |
| 2020/0103918 | A1 | 4/2020 | Lee |

(Continued)

FOREIGN PATENT DOCUMENTS

| KR | 20190138307 A | 12/2019 |
| WO | 2015179765 A1 | 11/2015 |

OTHER PUBLICATIONS

International Search Report and Written Opinion for Application No. PCT/US21/50203 dated Dec. 21, 2021.

*Primary Examiner* — Mohamed Barakat
(74) *Attorney, Agent, or Firm* — Botos Churchill IP Law

(57) ABSTRACT

Aspects of the disclosure provide for displaying notifications on a display of an autonomous vehicle. In one instance, a distance from the vehicle to a destination of the vehicle or a passenger may be determined. When the distance is between a first distance and a second distance, a first notification may be displayed on the display. The second distance may be less than the first distance. When the distance is less than the second distance, a second notification may be displayed on the display. The second notification provides additional information not provided by the first notification.

29 Claims, 8 Drawing Sheets

(56) References Cited

U.S. PATENT DOCUMENTS

2020/0114816 A1* 4/2020 Morimura .............. G08G 1/005
2020/0117193 A1* 4/2020 Zhou ...................... G08G 1/166
2020/0219397 A1   7/2020 Matthiesen et al.

* cited by examiner

FIGURE 6A
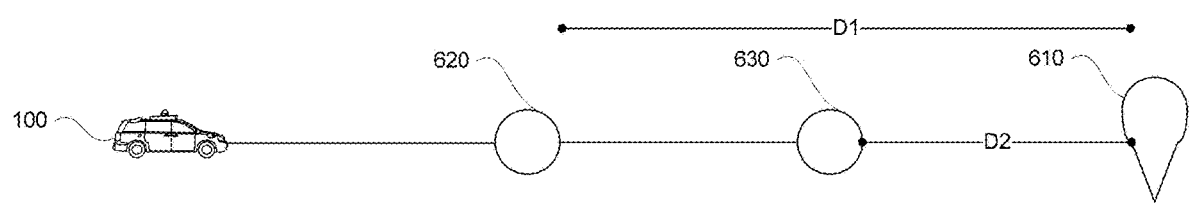
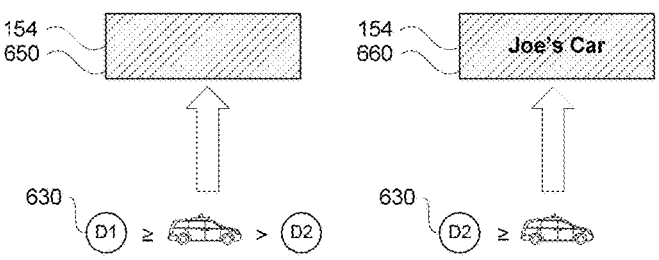
FIGURE 6B    FIGURE 6C

EXTERNAL FACING COMMUNICATIONS FOR AUTONOMOUS VEHICLES

BACKGROUND

Autonomous vehicles, for instance, vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location. Autonomous vehicles are equipped with various types of sensors in order to detect objects in the surroundings. For example, autonomous vehicles may include sonar, radar, camera, LIDAR, and other devices that scan and record data from the vehicle's surroundings.

When a person (or user) wants to be physically transported between two locations via a vehicle, they may use any number of taxi services. To date, these services typically involve a human driver who is given dispatch instructions to a location to pick up and drop off the user. In addition, human drivers are able to communicate with the use of physical gestures (hand, head, facial), a phone call, or an in-person discussion between the driver and the passenger. Autonomous vehicles, however, may not always have a human driver who can make such communications.

BRIEF SUMMARY

Aspects of the disclosure provide a method of displaying notifications on a display of an autonomous vehicle. The method includes determining, by one or more processors of the vehicle, when the vehicle is between a first distance and a second distance of a location, the location being a destination for the vehicle or a location of a passenger; when the vehicle is determined to be between the first distance and the second distance of the location, displaying, by the one or more processors, on the display a first notification, the second distance being less than the first distance; determining, by one or more processors of the vehicle, when the vehicle is less than the second distance from the location; and when the vehicle is determined to be less than the second distance from the location, displaying, by the one or more processors, on the display a second notification, wherein the second notification provides additional information not provided by the first notification.

In one example, the first notification includes a color which identifies the vehicle to the passenger. In another example, the first notification does not include alphanumeric characters. In this example, the second notification includes the color with alphanumeric characters, wherein the alphanumeric characters provide the additional information. In addition or alternatively, the second notification includes the color with one or more icons, wherein the one or more icons provide the additional information. In another example, the distance is the distance to the passenger, and wherein the distance is determined based on location information determined at a client computing device of the passenger. In another example, the first notification is brighter than the second notification. In another example, the second notification is brighter than the first notification. In another example, the method also includes determining a brightness of the first or the second notification based on the distance, and displaying the first notification is further based on the brightness. In another example, the method also includes determining a brightness of the first notification or the second notification based on current traffic conditions, and displaying the first notification is further based on the brightness. In another example, the method also includes determining a brightness of the first or the second notification based current weather conditions, and displaying the first notification is further based on the brightness. In another example, displaying the first notification is further based on a current speed of the vehicle. In another example, displaying the second notification is further based on a current speed of the vehicle. In another example, the method also includes determining one or both of the first or second distances based on context in which the vehicle is driving. In this example, the context includes a current speed of the vehicle. In addition or alternatively, the context includes a number of passengers waiting for a pickup. In addition or alternatively, the context includes a number of vehicles picking up or dropping off a passenger. In addition or alternatively, the context includes current traffic conditions. In another example, the method also includes receiving a request to change the display of the first or the second notification. In this example, the method also includes, in response to the request, flashing the display. In another example, the method also includes, in response to the request, increasing a brightness of the display.

BRIEF DESCRIPTION OF THE DRAWINGS

FIG. 6A-6C is example representations of first and second distances and first and second notifications in accordance with aspects of the disclosure.

DETAILED DESCRIPTION

Overview

Figure 1:
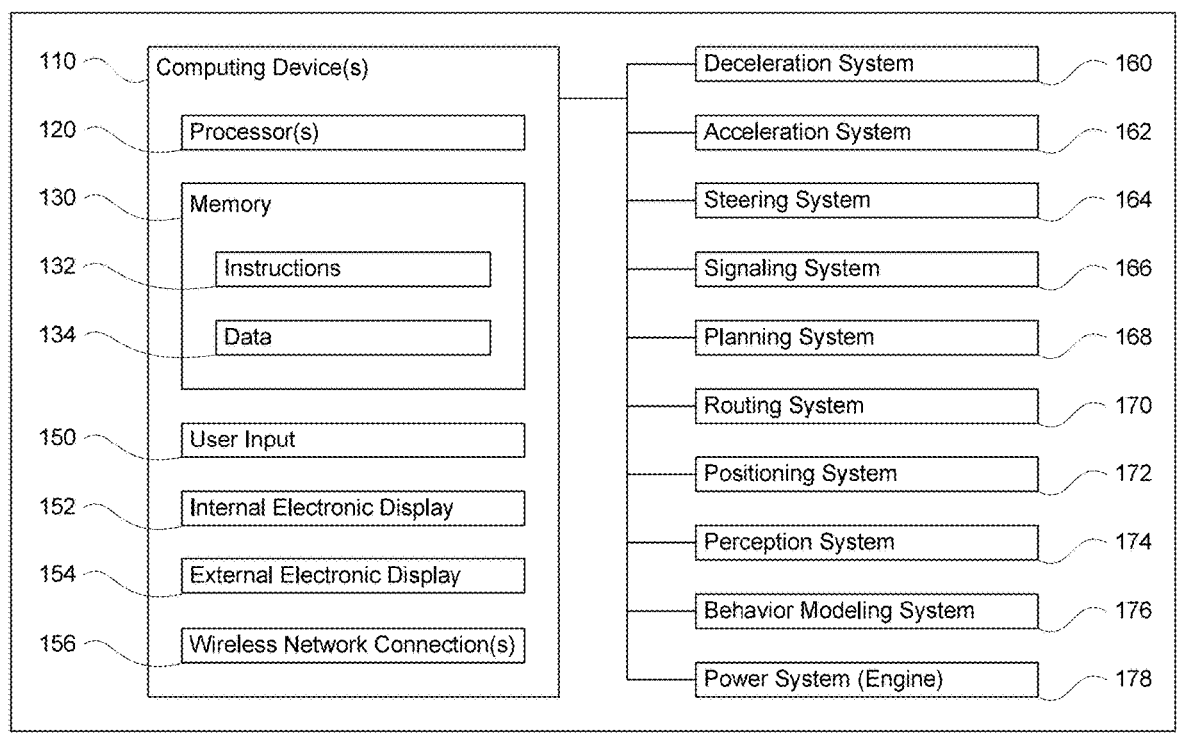
FIG. 1 is a functional diagram of an example vehicle in accordance with an exemplary embodiment.

The technology relates to communicating information to persons, potential passengers and others, outside of an autonomous vehicle. For vehicles with human drivers, there are ways to communicate with the use of physical gestures (hand, head, facial). Autonomous vehicles, however, may not always have a human driver who can make such communications. Thus, the features described herein may enable an autonomous vehicle to communicate with persons outside of the vehicle. To do so, information may be presented on a display which may be mounted at various locations on the vehicle, such as a display mounted at the center of a dashboard of the vehicle and oriented outwards, a display mounted on the roof, or at some other portion of the vehicle. In some instances, the display may be flat, curved or even 360 degrees.

Moreover, information provided on the display can be contextually-aware of the vehicle's environment. For instance, the vehicle's various systems may provide a notification based on information such as time of day, weather, level of traffic congestion, location of objects, as well as other social and situational information about the vehicle's environment. The notification system may then dynamically adjust the information accordingly. This may even involve adjusting information appropriately to increase legibility and comprehension of a message.

In one example the context and content of information displayed on the display may be determined based on a distance (in time and/or space) to a pickup location for a passenger or a distance to a passenger of the vehicle as well as related considerations. The vehicle's computing devices may determine whether the destination or the passenger is greater than a second distance to the destination or the passenger but within a first distance to the destination or the passenger. When the vehicle is between these two distances to the destination or the passenger, the vehicle may display a first notification on the display.

The vehicle's computing devices may determine whether the distance to the destination or the passenger within the second distance to the destination or the passenger. At distances within the second distance, the vehicle may display a second notification on the display. This second notification may include aspects of the first notification, but may also provide additional information such as text (including alphanumeric characters), images, icons or other details which the passenger can use to identify whether the vehicle has been assigned to the passenger.

The first and second distances may be fixed values or may be adjusted based on the context in which the vehicle is currently driving. For instance, the first and/or second distances may be increased or decreased depending on the speed of the vehicle, the number of other pedestrians or passenger waiting for a pickup nearby, and/or the number of other vehicles (which may or may not be a part of a fleet of autonomous vehicles attempting to pick up or drop off passengers).

The features described herein may enable an autonomous vehicle to communicate with persons outside of the vehicle. In particular, the features described herein may allow a vehicle to display information in order to better enable those passengers to recognize the vehicle in a way that is both practical and efficient.

Example Systems

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, buses, recreational vehicles, etc. The vehicle may have one or more computing devices, such as computing device 110 containing one or more processors 120, memory 130 and other components typically present in general purpose computing devices.

The memory 130 stores information accessible by the one or more processors 120, including instructions 134 and data 132 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 134 may be any set of instructions to be executed directly (such as machine code) or indirectly (such as scripts) by the processor. For example, the instructions may be stored as computing device code on the computing device-readable medium. In that regard, the terms "instructions" and "programs" may be used interchangeably herein. The instructions may be stored in object code format for direct processing by the processor, or in any other computing device language including scripts or collections of independent source code modules that are interpreted on demand or compiled in advance. Functions, methods and routines of the instructions are explained in more detail below.

The data 132 may be retrieved, stored or modified by processor 120 in accordance with the instructions 134. For instance, although the claimed subject matter is not limited by any particular data structure, the data may be stored in computing device registers, in a relational database as a table having a plurality of different fields and records, XML documents or flat files. The data may also be formatted in any computing device-readable format.

The one or more processor 120 may be any conventional processors, such as commercially available CPUs or GPUs. Alternatively, the one or more processors may be a dedicated device such as an ASIC or other hardware-based processor. Although FIG. 1 functionally illustrates the processor, memory, and other elements of computing device 110 as being within the same block, it will be understood by those of ordinary skill in the art that the processor, computing device, or memory may actually include multiple processors, computing devices, or memories that may or may not be stored within the same physical housing. For example, memory may be a hard drive or other storage media located in a housing different from that of computing device 110. Accordingly, references to a processor or computing device will be understood to include references to a collection of processors or computing devices or memories that may or may not operate in parallel.

Computing devices 110 may include all of the components normally used in connection with a computing device such as the processor and memory described above as well as a user input 150 (e.g., a mouse, keyboard, touch screen and/or microphone), various electronic displays (e.g., a monitor having a screen or any other electrical device that is operable to display information), and speakers to provide information to a passenger of the vehicle 100 as needed. For example, electronic display 152 may be located within a cabin of vehicle 100 and may be used by computing devices 110 to provide information to passengers within the vehicle 100. Electronic display 154 may be located on an exterior of the vehicle, such as mounted on the roof or at some other portion of the vehicle. Alternatively, the display 154 or in an interior location which allows persons outside of the vehicle to view information presented on the display 154, such as s a display mounted at the center of a dashboard of the vehicle and oriented outwards. In some instances, the displays 152, 154, may be flat, curved, and may extend 360 degrees. As discussed in further detail below, the computing devices 110 in combination with display 152 and/or display 154 may be a notification system which can provide information to passengers as well as other persons outside of the vehicle 100.

Computing devices 110 may also include one or more wireless network connections 156 to facilitate communication with other computing devices, such as the client computing devices and server computing devices described in detail below. The wireless network connections may include short range communication protocols such as Bluetooth, Bluetooth low energy (LE), cellular connections, as well as various configurations and protocols including the Internet, World Wide Web, intranets, virtual private networks, wide area networks, local networks, private networks using communication protocols proprietary to one or more companies, Ethernet, WiFi and HTTP, and various combinations of the foregoing.

The computing devices 110 may function as an autonomous control system, and may be capable of communicating with various components of the vehicle in order to control the vehicle in an autonomous driving mode. For example, returning to FIG. 1, the computing devices 110 may be in communication with various systems of vehicle 100, such as deceleration system 160, acceleration system 162, steering system 164, routing system 166, planning system 168, routing system 170, positioning system 172, and perception system 174 in order to control the movement, speed, etc. of vehicle 100 in accordance with the instructions 134 of memory 130 in the autonomous driving mode.

As an example, a computing device of the computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 is configured for use on a road, such as a car or truck, the steering system may include components to control the angle of wheels to turn the vehicle. The computing devices 110 may also use the signaling system in order to signal the vehicle's intent to other drivers or vehicles, for example, by lighting turn signals or brake lights when needed.

Routing system 166 may be used by the computing devices 110 in order to generate a route to a destination. Planning system 168 may be used by computing device 110 in order to follow the route. In this regard, the planning system 168 and/or routing system 166 may store detailed map information, e.g., highly detailed maps identifying a road network including the shape and elevation of roadways, lane lines, intersections, crosswalks, speed limits, traffic signals, buildings, signs, real time traffic information, pullover spots, vegetation, or other such objects and information.

Figure 2:
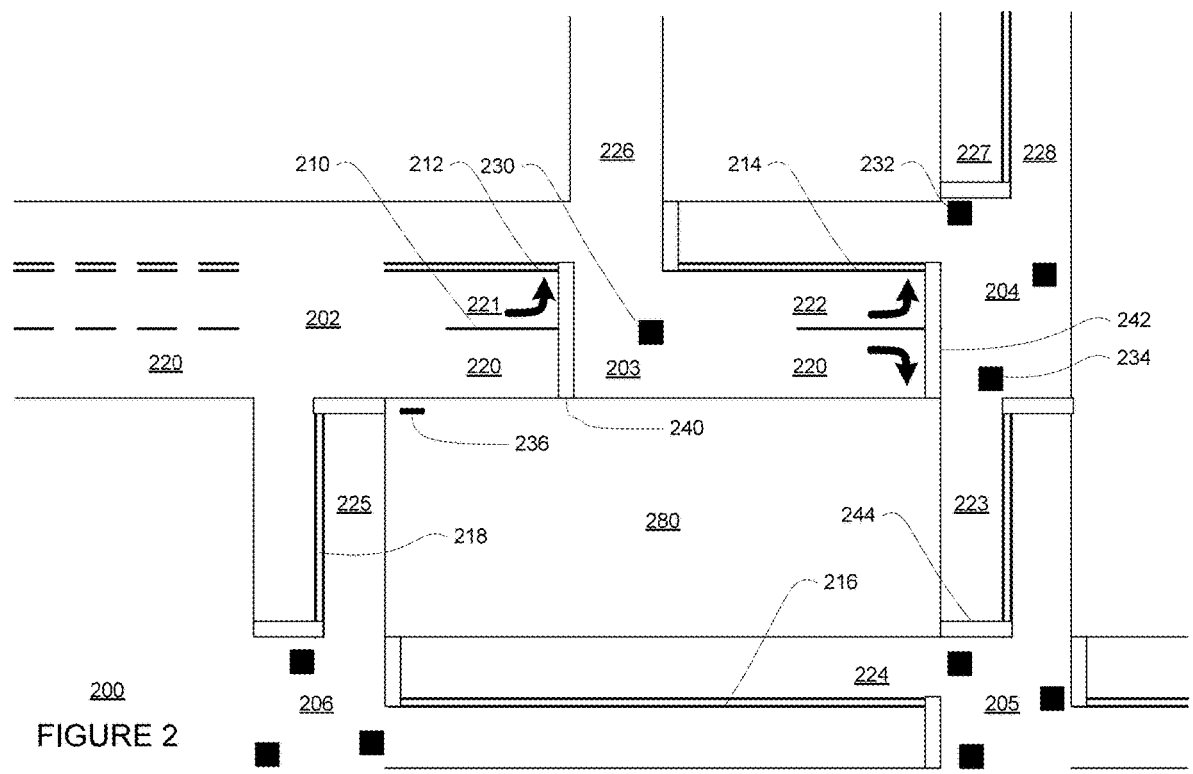
FIG. 2 is an example of map information in accordance with aspects of the disclosure.

FIG. 2 is an example of map information 200 for a small section of roadway including intersections 202, 203, 204, 205, 206. FIG. 2A depicts a portion of the map information 200 that includes information identifying the shape, location, and other characteristics of lane markers or lane lines 210, 212, 214, 216, 218, lanes 220, 221, 222, 223, 224, 225, 226, 227, 228, traffic control devices including traffic signal lights 230, 232, 234 and stop sign 236 (not depicted in FIG. 2B for clarity), stop lines 240, 242, 244, as well as a non-drivable area 280. In this example, lane 221 approaching intersection 204 is a left turn only lane, lane 222 approaching intersection 206 is a left turn only lane, and lane 226 is a one-way street where the direction of traffic moves away from intersection 204. In addition to the aforementioned features, the map information may also include information that identifies the direction of traffic for each lane as well as information that allows the computing devices 110 to determine whether the vehicle has the right of way to complete a particular maneuver (i.e. complete a turn or cross a lane of traffic or intersection).

Although the map information is depicted herein as an image-based map, the map information need not be entirely image based (for example, raster). For instance, the map information may include one or more roadgraphs, graph networks or road networks of information such as roads, lanes, intersections, and the connections between these features which may be represented by road segments. Each feature in the map may also be stored as graph data and may be associated with information such as a geographic location and whether or not it is linked to other related features, for example, a stop sign may be linked to a road and an intersection, etc. In some examples, the associated data may include grid-based indices of a road network to allow for efficient lookup of certain road network features.

In this regard, in addition to the aforementioned physical feature information, the map information may include a plurality of graph nodes and edges representing road or lane segments that together make up the road network of the map information. Each edge is defined by a starting graph node having a specific geographic location (e.g. latitude, longitude, altitude, etc.), an ending graph node having a specific geographic location (e.g. latitude, longitude, altitude, etc.), and a direction. This direction may refer to a direction the vehicle 100 must be moving in in order to follow the edge (i.e. a direction of traffic flow). The graph nodes may be located at fixed or variable distances. For instance, the spacing of the graph nodes may range from a few centimeters to a few meters and may correspond to the speed limit of a road on which the graph node is located. In this regard, greater speeds may correspond to greater distances between graph nodes.

The routing system 166 may use the roadgraph to determine a route from a current location (e.g. a location of a current node) to a destination. Routes may be generated using a cost-based analysis which attempts to select a route to the destination with the lowest cost. Costs may be assessed in any number of ways such as time to the destination, distance traveled (each edge may be associated with a cost to traverse that edge), types of maneuvers required, convenience to passengers or the vehicle, etc. Each route may include a list of a plurality of nodes and edges which the vehicle can use to reach the destination. Routes may be recomputed periodically as the vehicle travels to the destination.

Positioning system 172 may be used by computing devices 110 in order to determine the vehicle's relative or absolute position on a map or on the earth. For example, the positioning system 172 may include a GPS receiver to determine the device's latitude, longitude and/or altitude position. Other location systems such as laser-based localization systems, inertial-aided GPS, or camera-based localization may also be used to identify the location of the vehicle. The location of the vehicle may include an absolute geographical location, such as latitude, longitude, and altitude, a location of a node or edge of the roadgraph as well as relative location information, such as location relative to other cars immediately around it which can often be determined with less noise that absolute geographical location.

The positioning system 170 may also include other devices in communication with the computing devices computing devices 110, such as an accelerometer, gyroscope or another direction/speed detection device to determine the direction and speed of the vehicle or changes thereto. By way of example only, an acceleration device may determine its pitch, yaw or roll (or changes thereto) relative to the direction of gravity or a plane perpendicular thereto. The device may also track increases or decreases in speed and the direction of such changes. The device's provision of location and orientation data as set forth herein may be provided automatically to the computing device 110, other computing devices and combinations of the foregoing.

Figure 3:
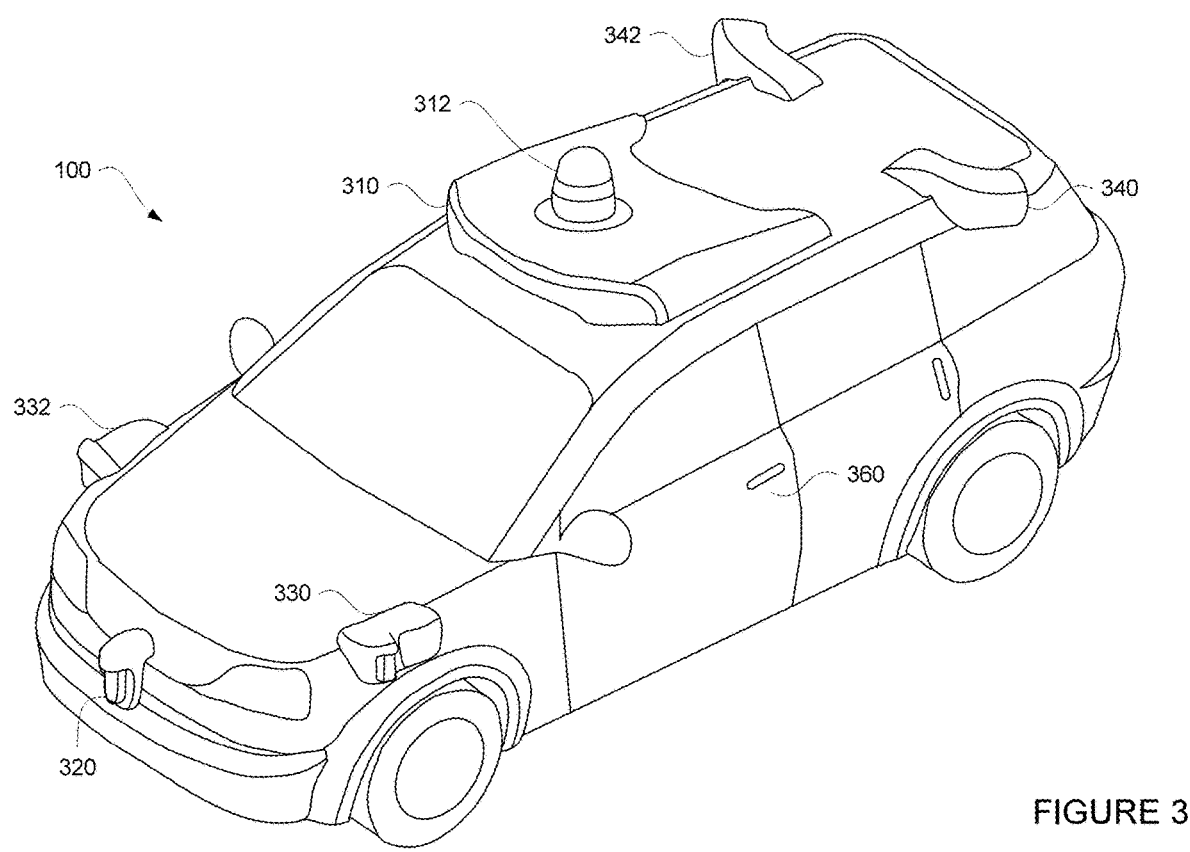
FIG. 3 is an example external view of a vehicle in accordance with aspects of the disclosure.

The perception system 174 also includes one or more components for detecting objects external to the vehicle such as other vehicles, obstacles in the roadway, traffic signals, signs, trees, etc. For example, the perception system 174 may include lasers, sonar, radar, cameras and/or any other detection devices that record data which may be processed by the computing devices of the computing devices 110. In the case where the vehicle is a passenger vehicle such as a minivan, the minivan may include a laser or other sensors mounted on the roof or other convenient location. For instance, FIG. 3 is an example external view of vehicle 100. In this example, roof-top housing 310 and dome housing 312 may include a LIDAR sensor as well as various cameras and radar units. In addition, housing 320 located at the front end of vehicle 100 and housings 330, 332 on the driver's and passenger's sides of the vehicle may each store a LIDAR sensor. For example, housing 330 is located in front of driver door 360. Vehicle 100 also includes housings 340, 342 for radar units and/or cameras also located on the roof of vehicle 100. Additional radar units and cameras (not shown) may be located at the front and rear ends of vehicle 100 and/or on other positions along the roof or roof-top housing 310.

The computing devices 110 may be capable of communicating with various components of the vehicle in order to control the movement of vehicle 100 according to primary vehicle control code of memory of the computing devices 110. For example, returning to FIG. 1, the computing devices 110 may include various computing devices in communication with various systems of vehicle 100, such as deceleration system 160, acceleration system 162, steering system 164, routing system 166, planning system 168, positioning system 170, perception system 174, and power system 178 (i.e. the vehicle's engine or motor) in order to control the movement, speed, etc. of vehicle 100 in accordance with the instructions 134 of memory 130.

The various systems of the vehicle may function using autonomous vehicle control software in order to determine how to and to control the vehicle. As an example, a perception system software module of the perception system 174 may use sensor data generated by one or more sensors of an autonomous vehicle, such as cameras, LIDAR sensors, radar units, sonar units, etc., to detect and identify objects and their characteristics. These characteristics may include location, type, heading, orientation, speed, acceleration, change in acceleration, size, shape, etc. In some instances, characteristics may be input into a behavior prediction system software module of a behavior modeling system 176 which uses various behavior models based on object type to output a predicted future behavior for a detected object. In other instances, the characteristics may be put into one or more detection system software modules, such as a traffic light detection system software module configured to detect the states of known traffic signals, construction zone detection system software module configured to detect construction zones from sensor data generated by the one or more sensors of the vehicle as well as an emergency vehicle detection system configured to detect emergency vehicles from sensor data generated by sensors of the vehicle. Each of these detection system software modules may uses various models to output a likelihood of a construction zone or an object being an emergency vehicle. Detected objects, predicted future behaviors, various likelihoods from detection system software modules, the map information identifying the vehicle's environment, position information from the positioning system 170 identifying the location and orientation of the vehicle, a destination location or node for the vehicle as well as feedback from various other systems of the vehicle may be input into a planning system software module of the planning system 168. The planning system 168 may use this input to generate trajectories for the vehicle to follow for some brief period of time into the future based on a route generated by a routing module of the routing system 166. In this regard, the trajectories may define the specific characteristics of acceleration, deceleration, speed, etc. to allow the vehicle to follow the route towards reaching a destination. A control system software module of the computing devices 110 may be configured to control movement of the vehicle, for instance by controlling braking, acceleration and steering of the vehicle, in order to follow a trajectory.

The computing devices 110 may control the vehicle in an autonomous driving mode by controlling various components. For instance, by way of example, the computing devices 110 may navigate the vehicle to a destination location completely autonomously using data from the detailed map information and planning system 168. The computing devices 110 may use the positioning system 170 to determine the vehicle's location and perception system 174 to detect and respond to objects when needed to reach the location safely. Again, in order to do so, computing device 110 and/or planning system 168 may generate trajectories and cause the vehicle to follow these trajectories, for instance, by causing the vehicle to accelerate (e.g., by supplying fuel or other energy to the engine or power system 178 by acceleration system 162), decelerate (e.g., by decreasing the fuel supplied to the engine or power system 178, changing gears, and/or by applying brakes by deceleration system 160), change direction (e.g., by turning the front or rear wheels of vehicle 100 by steering system 164), and signal such changes (e.g., by lighting turn signals). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

Figure 4:
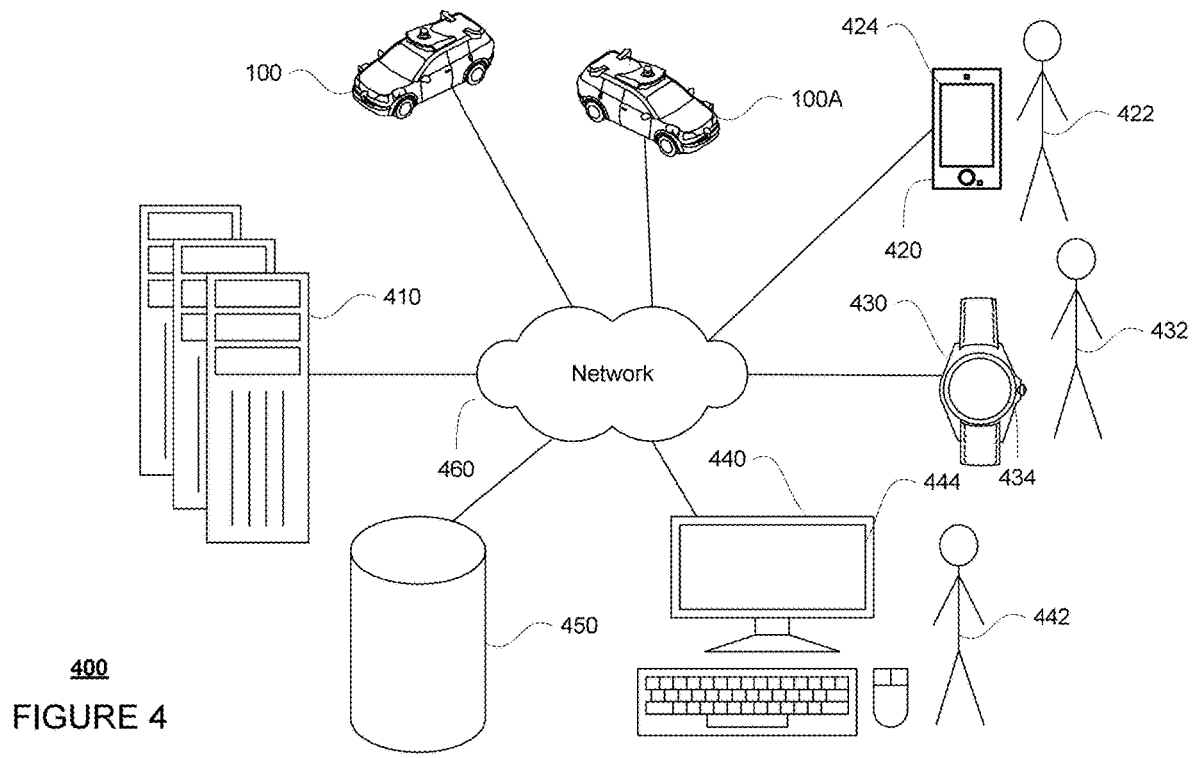
FIG. 4 is a pictorial diagram of an example system in accordance with aspects of the disclosure.
Figure 5:
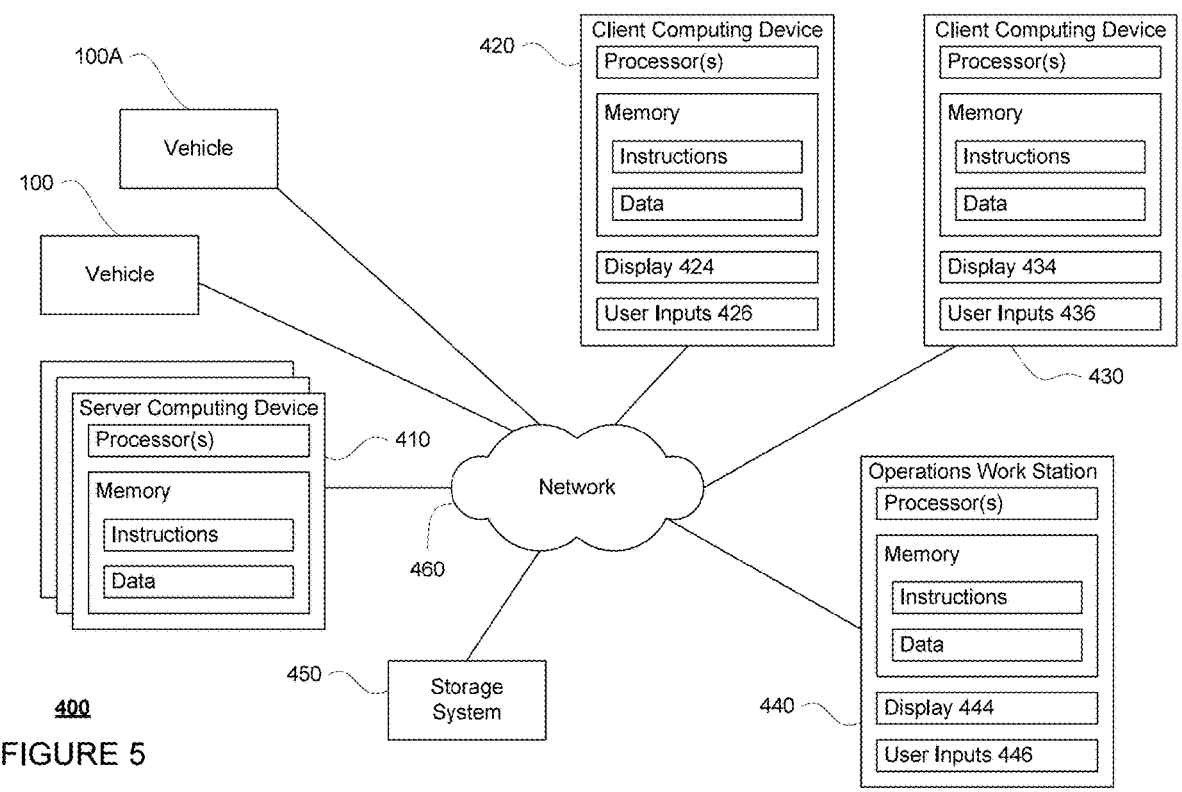
FIG. 5 is a functional diagram of the system of FIG. 4 in accordance with aspects of the disclosure.

Computing device 110 of vehicle 100 may also receive or transfer information to and from other computing devices, such as those computing devices that are a part of the transportation service as well as other computing devices. FIGS. 4 and 5 are pictorial and functional diagrams, respectively, of an example system 400 that includes a plurality of computing devices 410, 420, 430, 440 and a storage system 450 connected via a network 460. System 400 also includes vehicle 100 and vehicle 100A, which may be configured the same as or similarly to vehicle 100. Although only a few vehicles and computing devices are depicted for simplicity, a typical system may include significantly more.

As shown in FIG. 5, each of computing devices 410, 420, 430, 440 may include one or more processors, memory, data and instructions. Such processors, memories, data and instructions may be configured similarly to one or more processors 120, memory 130, data 132, and instructions 134 of computing device 110.

The network 460, and intervening graph nodes, may include various configurations and protocols including short range communication protocols such as Bluetooth, Bluetooth LE, the Internet, World Wide Web, intranets, virtual private networks, wide area networks, local networks, private networks using communication protocols proprietary to one or more companies, Ethernet, WiFi and HTTP, and various combinations of the foregoing. Such communication may be facilitated by any device capable of transmitting data to and from other computing devices, such as modems and wireless interfaces.

In one example, one or more computing devices 410 may include one or more server computing devices having a plurality of computing devices, e.g., a load balanced server farm, that exchange information with different nodes of a network for the purpose of receiving, processing and transmitting the data to and from other computing devices. For instance, one or more computing devices 410 may include one or more server computing devices that are capable of communicating with computing device 110 of vehicle 100 or a similar computing device of vehicle 100A as well as computing devices 420, 430, 440 via the network 460. For example, vehicles 100, 100A, may be a part of a fleet of vehicles that can be dispatched by server computing devices to various locations. In this regard, the server computing devices 410 may function as a dispatching server computing system which can be used to dispatch vehicles such as vehicle 100 and vehicle 100A to different locations in order to pick up and drop off passengers. In addition, server computing devices 410 may use network 460 to transmit and present information to a user, such as user 422, 432, 442 on a display, such as displays 424, 434, 444 of computing devices 420, 430, 440. In this regard, computing devices 420, 430, 440 may be considered client computing devices.

As shown in FIG. 5, each client computing device 420, 430, 440 may be a personal computing device intended for use by a user 422, 432, 442, and have all of the components normally used in connection with a personal computing device including a one or more processors (e.g., a central processing unit (CPU)), memory (e.g., RAM and internal hard drives) storing data and instructions, a display such as displays 424, 434, 444 (e.g., a monitor having a screen, a touch-screen, a projector, a television, or other device that is operable to display information), and user input devices 426, 436, 446 (e.g., a mouse, keyboard, touchscreen or microphone). The client computing devices may also include a camera for recording video streams, speakers, a network interface device, and all of the components used for connecting these elements to one another.

Although the client computing devices 420, 430, and 440 may each comprise a full-sized personal computing device, they may alternatively comprise mobile computing devices capable of wirelessly exchanging data with a server over a network such as the Internet. By way of example only, client computing device 420 may be a mobile phone or a device such as a wireless-enabled PDA, a tablet PC, a wearable computing device or system, or a netbook that is capable of obtaining information via the Internet or other networks. In another example, client computing device 430 may be a wearable computing system, shown as a wristwatch as shown in FIG. 4. As an example the user may input information using a small keyboard, a keypad, microphone, using visual signals with a camera, or a touch screen.

In some examples, client computing device 420 may be a mobile phone used by a passenger of a vehicle. In other words, user 422 may represent a passenger. In addition, client communication device 430 may represent a smart watch for a passenger of a vehicle. In other words, user 432 may represent a passenger. The client communication device 440 may represent a workstation for an operations person, for example, a remote assistance operator or someone who may provide remote assistance to a vehicle and/or a passenger. In other words, user 442 may represent a remote assistance operator. Although only a few passengers and operations persons are shown in FIGS. 4 and 5, any number of such passengers and remote assistance operators (as well as their respective client computing devices) may be included in a typical system.

As with memory 130, storage system 450 can be of any type of computerized storage capable of storing information accessible by the server computing devices 410, such as a hard-drive, memory card, ROM, RAM, DVD, CD-ROM, write-capable, and read-only memories. In addition, storage system 450 may include a distributed storage system where data is stored on a plurality of different storage devices which may be physically located at the same or different geographic locations. Storage system 450 may be connected to the computing devices via the network 460 as shown in FIGS. 4 and 5, and/or may be directly connected to or incorporated into any of the computing devices 110, 410, 420, 430, 440, etc.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

In one aspect, a user may download an application for requesting a vehicle to a client computing device. For example, users 122 and 132 may download the application via a link in an email, directly from a website, or an application store to client computing devices 120 and 130. For example, client computing device may transmit a request for the application over the network, for example, to one or more server computing devices 110, and in response, receive the application. The application may be installed locally at the client computing device.

The user may then use his or her client computing device to access the application and request a vehicle. As an example, a user such as user 432 may use client computing device 430 to send a request to one or more server computing devices 110 for a vehicle. As part of this, the user may identify a pickup location, a destination location, a pickup location and a drop off location. In this regard, the drop off location may be a physically different location from a destination location.

A user or passenger may specify a pick up, intermediate destination, and final destination locations in various ways. As an example, a pickup location can be defaulted to the current location of the passenger's client computing device, but may also be a recent or saved location near the current location associated with the passenger's account. The passenger may enter an address or other location information, tap a location on a map or select a location from a list in order to identify a pickup and/or destination location. For instance, the client computing device 120 may send its current location, such as a GPS location, to the one or more server computing devices 110 via network 460 and/or a destination name or address for any intermediate and the final destination. In response, the server computing devices 410 may provide one or more suggested locations or may identify the current location as a pickup location and locations corresponding to the destination name or address as an intermediate or final destination for the vehicle. One the user (now a passenger) has selected or confirmed the pickup and destination locations, the server computing devices may assign a vehicle, such as vehicle 100, to the passenger and the passenger's trip and send dispatching instructions to the vehicle including the pickup location, an intermediate destination, and the final destination. This may cause the vehicle to control itself in the autonomous driving mode towards the pickup location, for instance by using the various systems of the vehicle as described above, in order to complete the trip. Although the examples herein relate to transporting passengers, similar features may be used for the transportation of goods or cargo.

As noted above, the features described herein may enable an autonomous vehicle, such as vehicle 100, to communicate with persons outside of the vehicle, including an assigned passenger. To do so, information may be presented on the display 152, 154. In addition, information provided on the display can be contextually-aware of the vehicle's environment. For instance, the vehicle's various systems may provide a notification system with information based on time of day, weather, level of traffic congestion, location of objects, as well as other social and situational information about the vehicle's environment. The notification system may then dynamically adjust the information accordingly. This may even involve adjusting information appropriately to increase legibility and comprehension of a message. Such adjustments may include, for example, amplifying or minimizing size, color, brightness, hue, or timing of content shown on the display based on the context in which the vehicle is driving and/or the intended viewer. Those adjustments might also use information about the passenger such as any preferences (may be indicated by a passenger or as a default via an application of the passenger's client computing device) for larger fonts.

Figure 8:
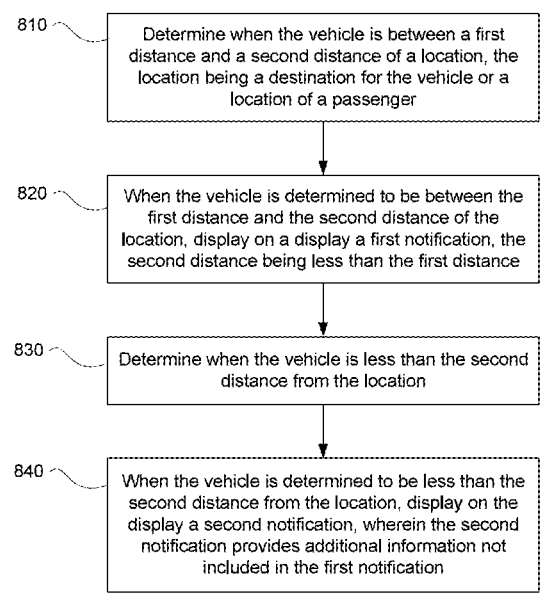
FIG. 8 is an example flow diagram in accordance with aspects of the disclosure.

For instance, the context and content of information displayed on the display may be determined based on a distance (in time and/or space) to a pickup location for a passenger or a distance to a passenger of the vehicle as well as related considerations. FIG. 8 provides an example flow diagram 800 for displaying notification on a display of an autonomous vehicle which may be performed by one or more processors of one or more computing devices such as the processors 120 of computing devices 110. At block 810, when the vehicle is between a first distance and a second distance of a location, the location being a destination for the vehicle or a location of a passenger is determined. At block 820, when the vehicle is determined to be between the first distance and the second distance of the location, a first notification is displayed on a display of the vehicle. The second is less than the first distance.

For instance, a passenger's location may be determined from one or more of a location approximated from a communication link between the passenger's client computing device (e.g. mobile phone) and the computing devices 110 or other computing devices of the vehicle, for instance via near field communication, Bluetooth, or other communication protocols. In addition or alternatively, the computing devices 110 may receive a location, e.g. a location identified by the passenger as a pickup location and/or determined from one or more of WiFi or GPS signals at the client computing devices, via the aforementioned communication link or from one or more server computing devices, such as the server computing devices 410, which may act as an intermediary between the passenger and the vehicle. In addition, the perception system 178 and/or the computing devices 110 (using information published by the perception system) may attempt to identify pedestrians who may be the passenger who are actively making progress towards the vehicle (e.g. walking towards rather than away from).

As noted above, the computing devices 110 may determine whether the vehicle 100 is between a first distance to the destination and a second distance to the destination or the passenger. The distance to the destination or the passenger may be a "straight line" distance or may be a distance along a route that the vehicle is currently traveling. In addition, the first and second distances may be defined in space (e.g. meters or feet) or in time (e.g. seconds).

FIG. 6A provides an example representation of vehicle 100 approaching a location 610 which may be a destination of the vehicle (e.g. to pick up a passenger) or a location of a passenger assigned to the vehicle. A first distance from the location 610 is identified by marker 620, and a second distance from the location 610 is identified by marker 630. In this example, vehicle 100 is depicted an arbitrary distance from marker 620. As noted above, the distances D1, D2 may be measured in time or in space. In addition, the distances may be a straight-line (e.g. "as the crow flies") distance or may be a distance along a route that the vehicle is currently traveling to reach the location 610.

Figure 7:
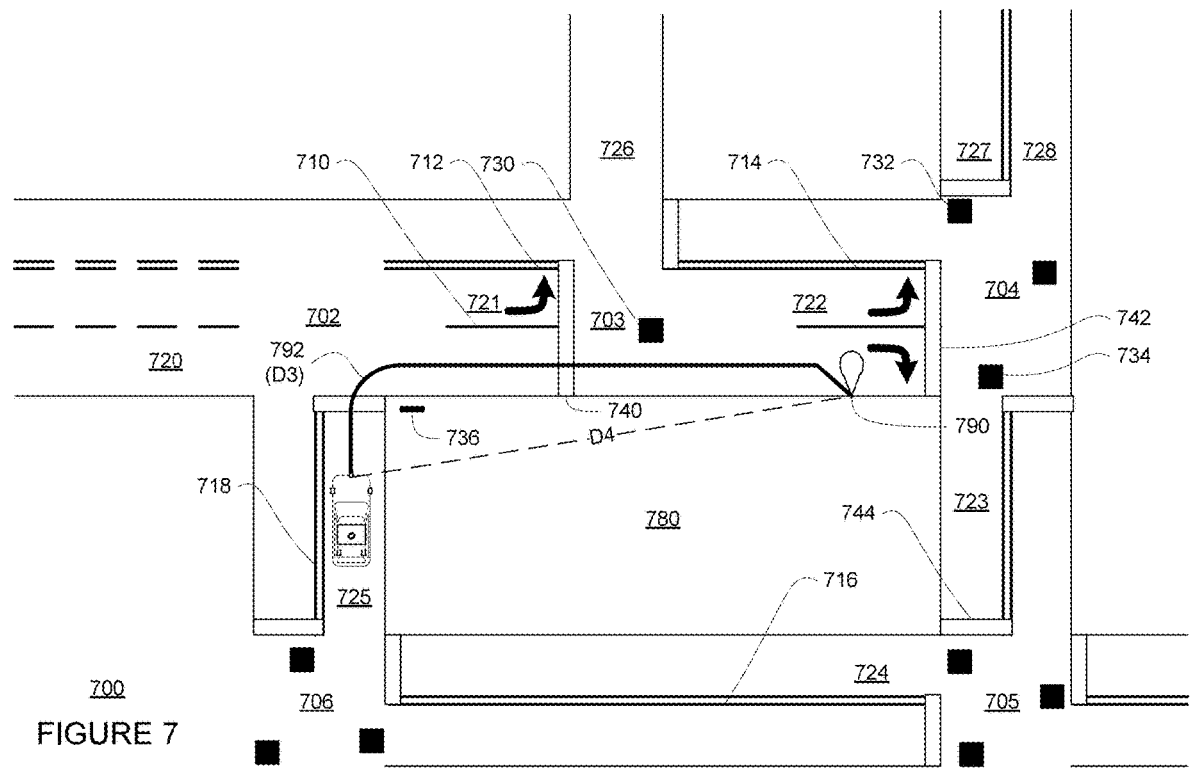
FIG. 7 is an example of a vehicle following a route in accordance with aspects of the disclosure.

FIG. 7 provides a bird's eye view of the vehicle 100 driving in a geographic area 700 corresponding to the area of the map information 200. In this regard, intersections 202, 203, 204, 205, 206 correspond to intersections 702, 703, 704, 705, 706, lane lines 210, 212, 214, 216, 218 correspond to lane lines 710, 712, 714, 716, 718, lanes 220, 221, 222, 223, 224, 225, 226, 227, 228 correspond to lanes 720, 721, 722, 723, 724, 725, 726, 727, 728, traffic signal lights 230, 232, 234 correspond to traffic signal lights 730, 732, 734, stop sign 236 corresponds to stop sign 736, stop lines 240, 242, 244 correspond to stop lines 740, 742, 744, and non-drivable area 280 corresponds to non-drivable area 780.

As shown in FIG. 7 vehicle 100 is following a route 792 to a location 790 in order to pick up an assigned passenger. In this example, the location 790 may represent a destination of the vehicle, or alternatively, a location of a passenger assigned to the vehicle. In this example, the distance D3 between the vehicle and the location 790 along the route 792 is longer than a straight-line distance D4 between the vehicle and the location 790.

For example, when the vehicle is the distance D1 or between the two distances D1 and D2 to the destination or the passenger, the vehicle may display a first notification on the display. This first notification may be fairly simple, such as a single block of color. For example, turning to FIG. 6B, a first notification 650 may be displayed on the display 152, 154 by the computing devices 110 when the vehicle reaches the location of marker 620 (or rather is the distance D1 from the location 610) or is between the locations of marker 620 and 630 (or rather between the two distances D1 and D2 from the location 610). In this example, the first notification 650 includes only a "color" (represented by shading). In this regard, the first notification does not include additional information such as text (including alphanumeric characters) and/or one or more images, icons, emoticons, emojis or other details. This may be because the first and second distance are far enough away from the destination or the passenger that the passenger would have a hard time perceiving any additional detail, such as 30 to 100 meters, 10 seconds to 30 seconds, or more or less. In this regard, the greater the first or second distances are, the greater amount of time or longer the notifications may be displayed.

Returning to FIG. 8, at block 830, when the vehicle is within the second distance from the location is determined. At block 840, when the vehicle is determined to be within the second distance from the location, a second notification is displayed on the display. The second notification provides additional information not provided by the first notification. For instance, the vehicle's computing devices may determine whether the distance to the destination or the passenger is at or less than the second distance. At distances at or less than the second distance, the computing devices 110 may display a second notification on the display 152, 154. This second notification may include the color of the first notification, but may also provide additional information such as text (including alphanumeric characters) and/or one or more images, icons, emoticons, emojis or other details which the passenger can use to identify whether the vehicle has been assigned to the passenger. For instance, images, icons, emoticons, emojis or other details may be displayed with text in order to distinguish between vehicle's assigned to different passengers. For example, an icon may be used to make common initials less ambiguous, such as placing an icon before or after "JS" for John Smith. Such images, icons, emoticons, emojis or other details may be selected by a passenger when setting up a trip, etc.

For example, turning to FIG. 6C, a second notification 660 may be displayed when the vehicle reaches the location of marker 630 (or rather is the distance D2 from the location 610) or is between the locations of marker 630 and the location 610 (or rather less than the distance D2 of marker 630 from the location 610). In this example, the second notification 660 displayed on the display 152, 154 includes both the "color" (represented by shading) from the first notification 650 as well as text, here, "Joe's Car" identifying the vehicle 100 as being assigned to passenger "Joe". In this regard, the second notification 660 provides additional information not provided by the first notification 650.

The first and second distances may be fixed values (e.g. predetermined) or may be default values that may be adjusted by the computing devices 110 based on the context in which the vehicle is currently driving. For instance, the first and/or second distances may be increased or decreased depending on the speed of the vehicle, the number of other pedestrians or passengers waiting for a pickup nearby to the destination of the vehicle and/or the passenger, and/or the number of other vehicles. These other vehicles may or may not be a part of the fleet of autonomous vehicles attempting to pick up or drop off passengers.

Information about the context in which the vehicle is driving may be determined, for instance, by information received by the computing devices 110 from remote computing devices (such as the server computing devices 410), the perception system 174, and/or may be determined from the map information. For example, information about weather or traffic conditions may be received from the server computing devices or another remote computing device. Information about other detected vehicles and pedestrians, and weather conditions may be received from the perception system 174 or other processing and detection systems of the vehicle (such as those dedicated to detecting weather conditions, etc.). Information about speed limits and other road conditions (e.g. geometry) may be determined from the map information.

When determining the first and second distances, the computing devices 110 may take into consideration the speed of the vehicle 100. The speed of the vehicle 100 may be determined, for example, using feedback from the vehicle's odometer and/or mathematically based on the vehicle's change in location determined using feedback from the positioning system 172. For instance, at higher speeds, even when the vehicle is between the first and second distances, it may be less useful to provide displayed information. In this regard, different first and/or second distances may be used when the vehicle pickup within or near a school zone, a construction zone, a residential area, on a 35 mph or higher street, etc. as determined from annotations, flags or other devices in the map information. Since speed is directly tied to time and distance traveled, the first and second distances may be adjusted based on the speed zone and/or the speed the vehicle is traveling. For example, this will mean that when a vehicle is picking up riders in a school zone, the first and/or second distances may be decreased, since the vehicle is traveling at a slower speed. In another example, the distances might be computed dynamically using a logarithmic or other formula based on current speed and/or distance. For instance, if the vehicle is turning into a parking spot to pick up a passenger in a parking lot from a higher speed roadway, as the vehicle's speed may be higher as it approaches the parking spot, the first and second distances can be adjusted to account for displaying information on a 45 mph road (in this case increase the first and/or second distances).

For example, a passenger may require more time to see the notifications in heavier traffic conditions, when there are many people waiting to be picked up, or when there are multiple autonomous vehicles picking up or dropping off passengers and thus, the first and/or second distances may be increased. Similarly, in congested areas where there might be a lot of competing visual factors (traffic, environmental surroundings, etc.), the first and/or second distances may be increased. In this regard, the first and second distances may be increased thereby increasing the amount of time that the first and/or second notifications are displayed. This, in turn, may provide more time for passengers to identify and recognize their assigned vehicle. In such circumstances, the display may also increase saturation or hue to aid in identification and recognition.

In another example, in a low-traffic suburban area at night, with slower speed limits, by the computing devices 110 may begin displaying the first notification closer to the destination rather than farther away, as the time needed for identification and recognition may be reduced in such circumstances. In this regard, the first and second distances may be decreased. In contrast, in daytime, the time needed for identification and recognition may be longer if the ambient light is bright. In this regard, the first and second distances may be increased.

In addition, the proximity to multiple pedestrians and/or pedestrians other than the passenger, may be used by the computing devices 110 to decrease the second distance. For example, in a construction zone with people who can be in fairly close proximity to the vehicle, the second distance may be increased in order to adjust timing of when text might appear so as to appear at a reasonable distance from such pedestrians, given the speed the vehicle is travelling.

In addition, the brightness of the first or second notification may be determined by the computing devices 110 based on circumstances such as current ambient lighting conditions, current weather conditions, current traffic conditions (i.e. brighter in heavier traffic), or simply be brighter the farther the vehicle is from the destination or the passenger. For example, in foggy or overcast conditions, brightness may be adjusted downwards. In another example, lighted and shaded areas may require different levels of brightness to retain contrast for legibility to allow a passenger to identify and recognize their assigned vehicle. For example, in the evening, the display may be clear and legible at a lower lumen level; however when picking up in a lighted parking area, underneath a street lamp or other well-lit area, the display may need to increase in brightness to increase contrast. In this regard, the first notification may be displayed brighter than the second notification or the second notification may be displayed brighter than the first notification depending upon the circumstances.

The computing devices 110 may implement the different first and second distances using lookup tables or other data structures prestored in the memory 130 or elsewhere on the vehicle based on the context in which the vehicle is driving and the destination (e.g. what type of locations are at or near where a passenger is going to be picked up. For example, TABLE 1 provides information for displaying a first notification when a vehicle is approaching a pickup of a passenger at or near (e.g. within some predetermined distance) of an intersection in a residential area or 25 mile per hour zone (as determined from the map information). In this example, the values provided in TABLE 1 may be adjusted based on lighting conditions. For example, during the evening or night time hours, when the ambient lighting is determined to be or is expected to be lower, the distances may be increased 25 meters.

Turning to TABLE 1 below, if there is no traffic, the first notification may be displayed when the vehicle is within 100 meters of the destination of the vehicle or the passenger when there is only a single pedestrian detected as this person is likely to be the passenger assigned to the vehicle. If there is high vehicular traffic or the area around the destination or the passenger is otherwise congested, the first notification may be displayed when the vehicle is 175 meters from the destination of the vehicle or the passenger.

TABLE 1 also provides information for how the first notification should be displayed when there are multiple riders or groups of riders waiting for a pickup at the destination. In this example, the first distances are increased. In this example, if there is no vehicular traffic, the first notification may be displayed when the vehicle is within 175 meters of the destination of the vehicle or the passenger. If there is high vehicle traffic or the area around the destination or the passenger is otherwise congested, the first notification may be displayed when the vehicle is 200 meters from the destination of the vehicle or the passenger.

TABLE 1

| Approaching a pickup near or at intersection in residential area (25 mph zone) | Single person/group (rider) | Multiple riders/groups of riders |
| --- | --- | --- |
| No traffic | Start display 100 m* before | Start display 175 m* before |
| High traffic, congested | Start display 175 m* before | Start display 200 m* before |

*increase 25 m depending on lighting conditions

For example, TABLE 2 below provides information for displaying a first notification when a vehicle is approaching a pickup of a passenger at or near a large parking area from (10 mph road) in a mall or shopping center or 10 mile per hour zone (as determined from the map information). In this example, the values provided in TABLE 2 may be adjusted based on lighting conditions. For example, during the evening or night time hours, when the ambient lighting is determined to be or is expected to be lower, the distances may be increased 50 meters or more or less. As shown in TABLE 2, if there is no traffic, the first notification may be displayed when the vehicle is within 50 meters of the destination of the vehicle or the passenger when there is only a single pedestrian detected as this person is likely to be the passenger assigned to the vehicle. If there is high vehicular traffic or the area around the destination or the passenger is otherwise congested, the first notification may be displayed when the vehicle is 100 meters from the destination of the vehicle or the passenger.

TABLE 2 also provides information for how the first notification should be displayed when there are multiple riders or groups of riders waiting for a pickup at the destination. In this example, the first distances are increased. In this example, if there is no vehicular traffic, the first notification may be displayed when the vehicle is within 75 meters of the destination of the vehicle or the passenger. If there is high vehicle traffic or the area around the destination or the passenger is otherwise congested, the first notification may be displayed when the vehicle is 150 meters from the destination of the vehicle or the passenger.

TABLE 2

| Approaching a pickup in large parking area from (10 mph road) in mall/shopping center | Single person (rider) | Group/cluster of people |
| --- | --- | --- |
| No traffic | Start display 50 m✢ before | Start display 75 m✢ before |
| High traffic, congested | Start display 100 m✢ before | Start display 150 m✢ before |

✢ increase 50 m depending on lighting conditions

Although TABLES 1 and 2 above provide examples of different distances in space, similar distances could also be determined in time. In addition, Tables 1 and 2 provide example distances for the first distance, but such tables or other tables may also include second distances for similar conditions as provided in the examples of Tables 3 and 4 below.

TABLE 3 provides information for displaying a second notification when a vehicle is approaching a pickup of a passenger at or near an intersection in a residential area or 25 mile per hour zone (as determined from the map information). In this example, the values provided in TABLE 3 may be adjusted based on lighting conditions. For example, during the evening or night time hours, when the ambient lighting is determined to be or is expected to be lower, the distances may be increased 25 meters.

Turning to TABLE 3, if there is no traffic, the second notification may be displayed when the vehicle is within 50 meters of the destination of the vehicle or the passenger when there is only a single pedestrian detected as this person is likely to be the passenger assigned to the vehicle. If there is high vehicular traffic or the area around the destination or the passenger is otherwise congested, the second notification may be displayed when the vehicle is 88 meters from the destination of the vehicle or the passenger.

TABLE 3 also provides information for how the second notification should be displayed when there are multiple riders or groups of riders waiting for a pickup at the destination. In this example, the second distances are increased. In this example, if there is no vehicular traffic, the second notification may be displayed when the vehicle is within 88 meters of the destination of the vehicle or the passenger. If there is high vehicle traffic or the area around the destination or the passenger is otherwise congested, the second notification may be displayed when the vehicle is 100 meters from the destination of the vehicle or the passenger.

TABLE 3

| Approaching a pickup near or at intersection in residential area (25 mph zone) | Single person/group (rider) | Multiple riders/groups of riders |
|---|---|---|
| No traffic | Start display 50 m* before | Start display 88 m* before |
| High traffic, congested | Start display 188 m+ before | Start display 100 m+ before |

*increase 25 m depending on lighting conditions

For example, TABLE 4 below provides information for displaying a second notification when a vehicle is approaching a pickup of a passenger at or near a large parking area from (10 mph road) in a mall or shopping center or 10 mile per hour zone (as determined from the map information). In this example, the values provided in TABLE 5 may be adjusted based on lighting conditions. For example, during the evening or night time hours, when the ambient lighting is determined to be or is expected to be lower, the distances may be increased 50 meters or more or less.

Turning to TABLE 4, if there is no traffic, the second notification may be displayed when the vehicle is within 25 meters of the destination of the vehicle or the passenger when there is only a single pedestrian detected as this person is likely to be the passenger assigned to the vehicle. If there is high vehicular traffic or the area around the destination or the passenger is otherwise congested, the second notification may be displayed when the vehicle is 50 meters from the destination of the vehicle or the passenger.

TABLE 4 also provides information for how the second notification should be displayed when there are multiple riders or groups of riders waiting for a pickup at the destination. In this example, the second distances are increased. In this example, if there is no vehicular traffic, the second notification may be displayed when the vehicle is within 48 meters of the destination of the vehicle or the passenger. If there is high vehicle traffic or the area around the destination or the passenger is otherwise congested, the second notification may be displayed when the vehicle is 75 meters from the destination of the vehicle or the passenger.

TABLE 4

| Approaching a pickup in large parking area from (10 mph road) in mall/shopping center | Single person (rider) | Group/cluster of people |
|---|---|---|
| No traffic | Start display 25 m+ before | Start display 48 m+ before |
| High traffic, congested | Start display 50 m+ before | Start display 75 m+ before |

+ increase 50 m depending on lighting conditions

In addition, in some instances, a plurality of autonomous vehicles may coordinate and adjust display attributes such as hue and brightness, depending on the status of each passenger and that passenger's respective assigned vehicles. For example, if vehicle-A, B, & C are waiting on their riders-A, B, & C; if rider-A is outside of a visible range, rider-B is fairly close by, and rider-C is waiting, vehicle-C might have the brightest and most saturated hue, while and vehicle-B may display at a lower visual prominence to remain visible but give precedence to vehicle-C.

In certain cases where there is more than one display or where the display 152, 154 is able to display different information in different directions (e.g. a 360 degree display), the location of the passenger may be used to select a display or display the notifications on the display in such a way that the passenger would have a line of sight to the displayed notifications. In this way, the notification may be directional or oriented towards the passenger. In addition, in the case of multi-directional displays the notifications may "follow" the location of the passenger. This approach may also be used when providing notifications to non-passengers, such as in the examples of expressing intent below.

The display may also be changed based upon a pedestrian's gaze or behavior. For example, a pedestrian may be identified as a passenger assigned to a vehicle based on the pedestrian's gaze, gait, etc. In such instances, once a passenger is identified and determined to be looking at the vehicle, the size of any additional information on the display may be increased. Location (e.g. GPS) and other signals such as Bluetooth, from the passenger's client computing device could also be used as triggers to increase the size of the additional information.

In some instances, a passenger may be able to use his or her client computing devices in order to cause the vehicle to change the display. For instance, a passenger may shake a client computing device (which might be detected using device accelerometers), press an on-screen button, use voice commands, etc. in order to have the vehicle temporarily flash or increase the brightness of the display or otherwise show different content. Those temporary changes could be dynamically computed on the vehicle (for example using a time-based formula to compute the brightness) and/or combined with pre-computed (either stored in memory at the vehicle or on a separate computing device) images with changes in contrast or color, inverting of colors, motion, etc. In addition or alternatively, a passenger may be able to use the application to select from a predetermined set of sounds in order to cause the vehicle to play a sound (a ping, horn honk, melody, etc.) on an internal and/or an external speaker of the vehicle in order to assist the passenger in locating the vehicle. In addition, the sound volume can be influenced by user input. For example, shaking the passenger's client computing device longer or faster will gradually increase the volume or loop (e.g. repeat) audio sound.

The display may also be used to provide other types of information such as to signal status or intent. In this regard, the display may provide information about the vehicle's intent at unprotected intersections, when navigating in a parking lots, when staying parked for a while, when preparing to move after being parked for a while, when taking turns with other drivers in narrow passageways, responding to temporary road blockages, when entering a school or construction zone, when waiting for pedestrians (e.g. to cross), when waiting for oncoming traffic to clear, when responding to a person directing traffic, responding to an emergency vehicle and/or pulling over, by displaying hazard or arrow indicators to encourage other vehicles to drive around the vehicle, when acknowledging certain road users (i.e. that the vehicle "sees" a pedestrian or a bicyclist, etc. In some instances, these notifications may be "humanized", that is by using pronouns (e.g. my turn, I'm going next, etc.) or courtesies (e.g. please, thank you, etc.).

Other types of status information may be provided in notifications as well. This may include, for example, operational cues or alerts relating to battery or fuel status (e.g. low battery or low fuel), maintenance issues and their priority (e.g. low priority or high priority maintenance issue), driving state (e.g. autonomous or manual mode), current task or assignment status (e.g. vehicles collecting map data or testing may display different information than vehicles providing transportation services or vehicles may be leaving or just arriving at a depot or other location for service). Status information might be shown on request when a technician is nearby and/or has requested such information be shown for a limited time.

In addition, on high speed roads, such as those with speed limits at or above 45 mph or more or less, the display may provide information that is useful for broadcasting in high speed areas—with longer display times to accommodate for messaging at higher speeds. Example messages may be related to emergency signals, when the vehicle needs to broadcast a particular state so other drivers might have enough time to adjust and react safely. The vehicle may increase time to display communications prior to an event at higher speeds intent to pull over or that the car has pulled over and is still slowing (i.e. still moving).

In other instances, a group of appropriately equipped vehicles may display notifications in order to facilitate a technician finding a particular vehicle. For instance, vehicles may "point to" another vehicle in the group that is having issues for faster location of that vehicle having the issues. This may involve a flashing arrow, other icon, emoticon, or emoji oriented in the direction of that vehicle or sequential information (3 more cars, then 2 more cars, etc.). Vehicles may also use the displays to broadcast information to one another or signal a bigger message as a fleet. For example vehicles traveling together in a group might indicate approximately how much time until the entire group passes a given point. Or multiple vehicles could be used in a marriage proposal with each vehicle displaying one or a few words of a sentence.

In addition, the display may be used to display notifications related to passengers such as when a passenger is being picked up or dropped off. For instance, a notification that a vehicle is ready to board might be shown to one or more sides of the vehicle while displaying a "boarding" icon to the rear of the vehicle for other vehicles or drivers to indicate that a passenger might be about to board, explaining that the car is temporarily parked. Similarly, icons or other treatments (borders, inverse colors) may be used to indicate to a passenger when a vehicle is ready for the passenger to board versus still approaching the pickup location or when the passenger's client computing device has not yet been authenticated (e.g. authentication may take place between the computing devices 110 and the passenger's client computing device.

Similarly, when the vehicle is stopped at a crosswalk with pedestrians crossing, the vehicle may display a notification towards the front of the vehicle, "I'm stopped" or a pedestrian icon while to the rear of the vehicle may display a notification indicating that the vehicle is waiting because pedestrians are crossing. This may enable passengers as well as drivers (and potentially computers) of other vehicles to understand the vehicle's behavior. In this regard, for a multidirectional display or multiple displays, notifications can be directionally focused to multiple different viewers (e.g. pedestrians, vehicles, drivers, etc.) who are located in different directions.

On a vehicle capable of detecting and responding to passenger gestures, if a passenger were to gesture by waving to the vehicle, the display might confirm recognition of the gesture by providing information on the display. For example, the display may indicate that the vehicle sees the passenger, and if the passenger were to gesture or otherwise motion to the vehicle to come to where the rider indicates, the display would respond by indicating the intention to respond to the gesture, for instance, by indicating that the vehicle is heading over, etc. Similarly, the display may respond to gestures of non-passengers waving hello by showing a message like 'Hi there' or the like.

The features described herein may enable an autonomous vehicle to communicate with persons outside of the vehicle. In particular, the features described herein may allow a vehicle to display information in order to better enable those passengers to recognize the vehicle in a way that is both practical and efficient.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of displaying notifications on a display of an autonomous vehicle, the method comprising:
    determining, by one or more processors of the vehicle, a first distance from a location and a second distance from the location based on context in which the vehicle is driving, the location being a destination for the vehicle or a location of a passenger;

determining, by the one or more processors, when the vehicle is between the first distance and the second distance, when the vehicle is determined to be between the first distance and the second distance from the location, displaying, by the one or more processors, on the display a first notification, the second distance being less than the first distance;

determining, by the one or more processors, when the vehicle is less than the second distance from the location; and when the vehicle is determined to be less than the second distance from the location, displaying, by the one or more processors, on the display a second notification, wherein the second notification provides additional information not provided by the first notification.

2. The method of claim 1, wherein the first notification includes a color which identifies the vehicle to the passenger.

3. The method of claim 2, wherein the first notification does not include alphanumeric characters.

4. The method of claim 2, wherein the second notification includes the color with alphanumeric characters, wherein the alphanumeric characters provide the additional information.

5. The method of claim 2, wherein the second notification includes the color with one or more icons, wherein the one or more icons provide the additional information.

6. The method of claim 1, wherein at least one of the first distance and the second distance are determined further based on location information determined at a client computing device of the passenger.

7. The method of claim 1, wherein the first notification is brighter than the second notification.

8. The method of claim 1, wherein the second notification is brighter than the first notification.

9. The method of claim 1, further comprising, determining a brightness of the first or the second notification based on at least one of the first and second distances, and wherein displaying the first notification is further based on the brightness.

10. The method of claim 1, further comprising, determining a brightness of the first notification or the second notification based on current traffic conditions, and wherein displaying the first notification is further based on the brightness.

11. The method of claim 1, further comprising, determining a brightness of the first notification or the second notification based current weather conditions, and wherein displaying the first notification is further based on the brightness.

12. The method of claim 1, wherein displaying the first notification is further based on a current speed of the vehicle.

13. The method of claim 1, wherein displaying the second notification is further based on a current speed of the vehicle.

14. The method of claim 1, wherein the context further includes a current speed of the vehicle.

15. The method of claim 1, wherein the context further includes a number of passengers waiting for a pickup.

16. The method of claim 1, wherein the context further includes a number of other vehicles picking up or dropping off a passenger.

17. The method of claim 1, wherein the context further includes current traffic conditions.

18. The method of claim 1, further comprising, receiving a request to change the display of the first notification or the second notification.

19. The method of claim 18, further comprising, in response to the request, flashing the display.

20. The method of claim 19, further comprising, in response to the request, increasing a brightness of the display.

21. The method of claim 1, wherein the context further includes information about the vehicle's environment.

22. The method of claim 21, wherein the information about the vehicle's environment includes a level of traffic congestion.

23. The method of claim 21, wherein the information about the vehicle's environment includes an ambient lighting condition.

24. The method of claim 21, wherein the information about the vehicle's environment includes a current weather condition.

25. The method of claim 1, wherein the context further includes information about one or more people waiting to be picked up at the location.

26. The method of claim 1, wherein the determining the first distance and the second distance are further based on a type of the location.

27. The method of claim 1, wherein the type of the location is an intersection.

28. The method of claim 1, wherein the type of the location is a zone having a particular speed limit.

29. The method of claim 1, wherein the type of the location is a shopping center.

\* \* \* \* \*

UNITED STATES PATENT AND TRADEMARK OFFICE
CERTIFICATE OF CORRECTION

PATENT NO. : 11,491,909 B2
APPLICATION NO. : 17/022998
DATED : November 8, 2022
INVENTOR(S) : Maria Moon et al.

It is certified that error appears in the above-identified patent and that said Letters Patent is hereby corrected as shown below:

In the Claims

Claim 27, Column 22, Line 41:
Now reads: "The method of claim 1,"; should read -- The method of claim 26, --

Claim 28, Column 22, Line 43:
Now reads: "The method of claim 1,"; should read -- The method of claim 26, --

Claim 29, Column 22, Line 45:
Now reads: "The method of claim 1,"; should read -- The method of claim 26, --

Signed and Sealed this
Tenth Day of January, 2023

Katherine Kelly Vidal
*Director of the United States Patent and Trademark Office*